(12) United States Patent
Kerestecioglu

(10) Patent No.: US 8,357,230 B2
(45) Date of Patent: Jan. 22, 2013

(54) PROCESS AND APPARATUS FOR SEPARATING METAL CARBONYLS FROM SYNTHESIS GAS

(75) Inventor: Ulvi Kerestecioglu, Geltendorf (DE)

(73) Assignee: Linde Aktiengesellschaft, Munich (DE)

( * ) Notice: Subject to any disclaimer, the term of this patent is extended or adjusted under 35 U.S.C. 154(b) by 555 days.

(21) Appl. No.: 12/515,974

(22) PCT Filed: Nov. 6, 2007

(86) PCT No.: PCT/EP2007/009606
§ 371 (c)(1),
(2), (4) Date: Jan. 20, 2010

(87) PCT Pub. No.: WO2008/064761
PCT Pub. Date: Jun. 5, 2008

(65) Prior Publication Data
US 2010/0139489 A1    Jun. 10, 2010

(30) Foreign Application Priority Data
Nov. 28, 2006  (DE) .......................... 10 2006 056 117

(51) Int. Cl.
*B01D 53/14* (2006.01)
(52) U.S. Cl. ................. 95/180; 95/199; 95/200; 95/223; 95/228; 95/234
(58) Field of Classification Search .................... 95/199, 95/200, 230–236; 96/234, 265–266
See application file for complete search history.

(56) References Cited

U.S. PATENT DOCUMENTS

| | | | | |
|---|---|---|---|---|
| 3,239,432 A | * | 3/1966 | Rhodes et al. | 202/160 |
| 3,985,523 A | * | 10/1976 | Kaupas et al. | 95/193 |
| 4,118,285 A | * | 10/1978 | Yeh | 203/81 |
| 4,142,875 A | * | 3/1979 | Bohmholdt et al. | 95/205 |
| 4,146,569 A | * | 3/1979 | Giammarco et al. | 423/222 |
| 4,177,202 A | * | 12/1979 | Chang et al. | 518/714 |
| 4,254,094 A | * | 3/1981 | Hegarty | 423/658.3 |
| 4,324,567 A | * | 4/1982 | Ranke et al. | 95/161 |
| 4,425,317 A | * | 1/1984 | Zeller et al. | 423/574.1 |
| 4,702,898 A | * | 10/1987 | Grover | 423/220 |
| 6,521,783 B1 | * | 2/2003 | Wegman et al. | 560/232 |
| 8,063,110 B2 | * | 11/2011 | Atkins | 518/716 |

FOREIGN PATENT DOCUMENTS

| DE | 2610982 A1 | 9/1977 |
|---|---|---|
| WO | 2008064761 R | 3/2008 |

* cited by examiner

*Primary Examiner* — Duane Smith
*Assistant Examiner* — Ives Wu
(74) *Attorney, Agent, or Firm* — Millen, White, Zelano & Branigan, P.C.

(57) ABSTRACT

The invention relates to a process for purifying crude synthesis gas (1) containing metal carbonyls, in which undesirable substances such as sulphur components and/or carbon dioxide ($CO_2$) and/or hydrocyanic acid (HCN) are scrubbed out by scrubbing with a physically acting scrubbing medium in at least one process step (main scrub (H)), and also an apparatus for carrying out the process. The crude synthesis gas (1) before introduction into the main scrub (H) is subjected to a gas scrub (carbonyl scrub (C)) in which a partial amount (4) of the laden scrubbing medium (2) taken off from the main scrub is used as scrubbing medium, with the partial amount (4) being chosen so that the metal carbonyls are (selectively) separated off from the crude synthesis gas (1) in the carbonyl scrub (C) largely independently of the other gas components.

9 Claims, 1 Drawing Sheet

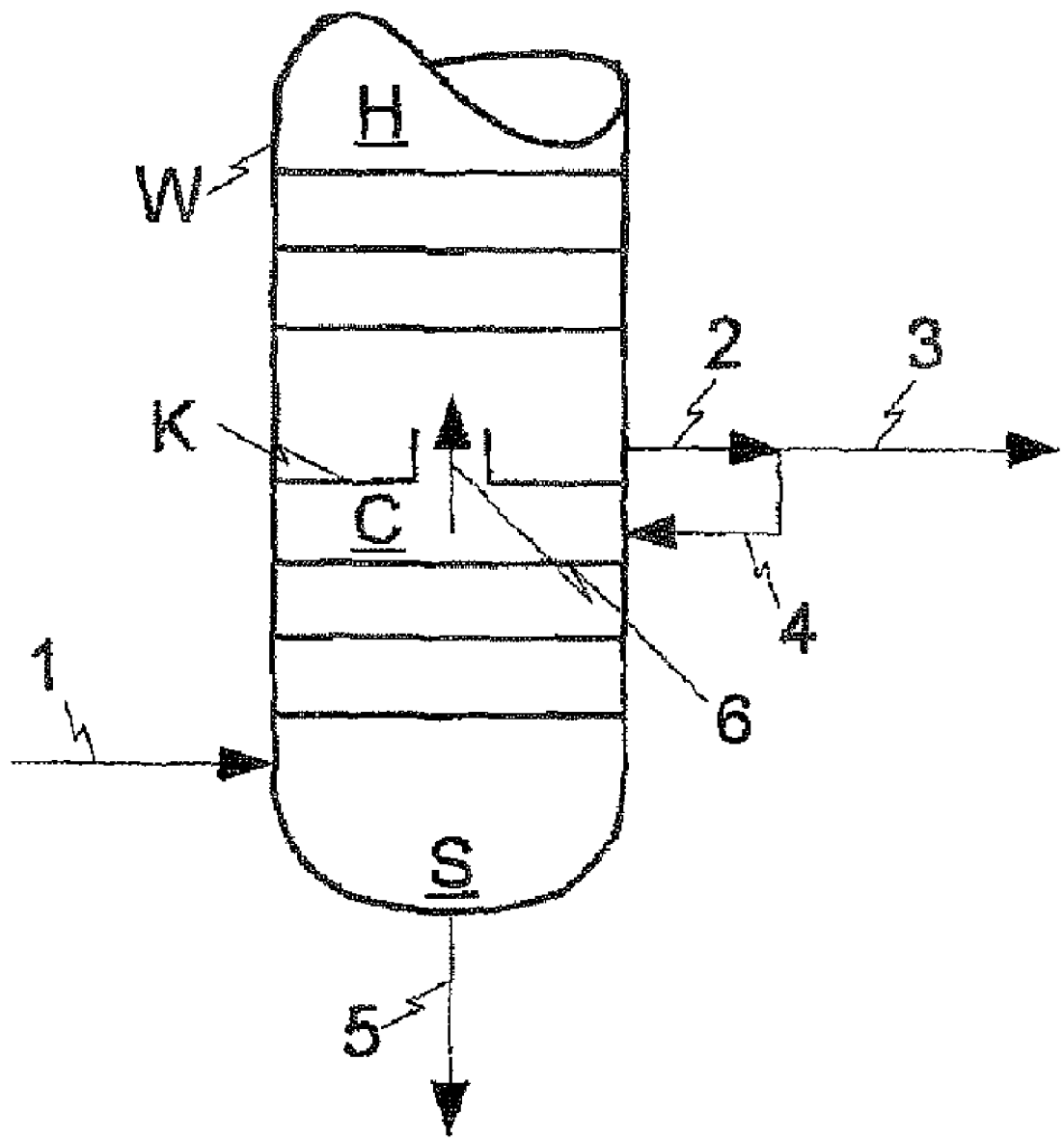

PROCESS AND APPARATUS FOR SEPARATING METAL CARBONYLS FROM SYNTHESIS GAS

The invention relates to a process for purifying crude synthesis gas containing metal carbonyls, in which undesirable substances such as sulphur components and/or carbon dioxide ($CO_2$) and/or hydrocyanic acid (HCN) are scrubbed out by scrubbing with a physically acting scrubbing medium in at least one process step (main scrub), and also an apparatus for carrying out the process.

Physical gas scrubs utilize the ability of liquids to absorb gaseous substances and keep them in solution without the gases being chemically bound. The ability of a gas to be absorbed by a liquid is expressed by the solubility coefficient: the better the gas dissolves in the liquid, the larger is its solubility coefficient. The solubility coefficient is temperature-dependent and generally increases with decreasing temperature.

After the gas scrub, the gas components scrubbed out are removed from the laden scrubbing medium, thus regenerating the scrubbing medium. The regenerated scrubbing medium is normally reused in the gas scrub, while the gas components which have been scrubbed out are either disposed of or passed to an economical use.

Preference is given to using physical scrubs for the purification of crude synthesis gases which are produced on an industrial scale from coal and/or hydrocarbon feeds in gasification plants, for example by steam reforming or by partial oxidation, and generally contain some undesirable constituents such as carbon dioxide ($CO_2$), hydrogen sulphide ($H_2S$), carbonyl sulphide (COS) or hydrocyanic acid (HCN). These processes are advantageous since the crude synthesis gases are nowadays usually produced under high pressure and the effectiveness of physical scrubs increases, to a first approximation, linearly with the operating pressure. A methanol scrub is of particular importance for the purification of crude synthesis gases. It makes use of the fact that the solubility coefficients of $H_2S$, COS, $CO_2$ and HCN in methanol cooled to a low temperature are several orders of magnitude different from those of hydrogen ($H_2$) and carbon monoxide (CO). The methanol is regenerated after the scrubbing process and recirculated to the process.

Particularly when the crude synthesis gases are produced under high pressure from starting materials containing heavy metals, they contain metal carbonyls, which are carbon monoxide complexes of zero-valent transition metals, as impurities. Metal carbonyls have a large solubility coefficient in methanol but also other physically acting scrubbing media and are therefore preferentially scrubbed out in a physical gas scrub. Especially at operating temperatures above 0° C., they form insoluble compounds with the abovementioned impurities and these deposit in the gas scrub, in particular in degassing columns of the regeneration facilities, and there lead to fouling of lines and apparatuses.

The German patent DE2610982 discloses a process which makes it possible for such deposits to be largely prevented. Here, the laden scrubbing medium containing metal carbonyls is heated to temperatures in the range from 70 to 250° C. at a pressure which is higher than the vapour pressure of the scrubbing medium in order to precipitate the metal carbonyls and, after a residence time which is in the range from 0.5 to 2 hours, is passed to the following regeneration steps. The apparatuses necessary for carrying out this process, e.g. heat exchangers for heating and cooling the scrubbing medium and vessels for the intermediate storage of the scrubbing medium during the residence time, incur considerable capital costs which increase with the amount of the scrubbing medium to be treated, as do the operating costs. Although the patent proposes treating only part of the laden scrubbing medium by the above process, it gives no suggestion as to how the total amount of metal carbonyls is to be removed from the scrubbing medium in the case of such a procedure.

It is therefore an object of the present invention to configure a process of the type mentioned at the outset and an apparatus for carrying out the process in such a way that crude synthesis gas can be freed of metal carbonyls in a more economical manner than is possible according to the prior art.

According to the invention, the object addressed is achieved in terms of a process by the crude synthesis gas before introduction into the main scrub being subjected to a gas scrub (carbonyl scrub) in which a partial amount of the laden scrubbing medium taken off from the main scrub is used as scrubbing medium, with the partial amount being chosen so that the metal carbonyls are (selectively) separated off from the crude synthesis gas in the carbonyl scrub largely independently of the other gas components.

If a gas component i is to be absorbed from a gas mixture by physical scrubbing, this requires a minimum amount $W_{min}$ of the liquid used as scrubbing medium which can be calculated very readily by means of the following formula:

$$W_{min}=V/(p \cdot \lambda_i)$$

In the formula, V is the total amount of gas mixture, p is the pressure prevailing in the gas mixture and $\lambda_i$ is the solubility coefficient of the gas component to be scrubbed out in respect of the scrubbing medium used. Owing to their solubility coefficients, which are far larger than those of the components to be separated off from the crude synthesis gas in the main scrub, the metal carbonyls can be removed from the crude synthesis gas by means of a comparatively small amount of scrubbing medium in a carbonyl scrub preceding the main scrub. To keep the metal carbonyls away from regeneration facilities, e.g. degassing columns, it is not necessary to subject the total amount of the scrubbing medium laden in the scrubbing of the crude synthesis gas to a complicated metal carbonyl removal but instead only the small partial amount laden with metal carbonyls in the carbonyl scrub has to be treated in this way. This considerably reduces the capital and operating costs for such a crude synthesis gas scrub compared to the prior art.

An embodiment of the process of the invention provides for the separation of the metal carbonyls from the crude synthesis gas to be carried out in at least two successive scrubbing steps, with the amount of scrubbing medium used in each scrubbing step being selected so that a different class of metal carbonyls is separated off largely selectively in each case.

A further embodiment of the process of the invention provides for the scrubbing medium laden with metal carbonyls in a scrubbing step to be passed in its entirety to a regeneration or be divided into two substreams of which one substream is introduced as scrubbing medium into the preceding scrubbing step and the other substream is passed to a regeneration.

In another embodiment of the process of the invention, it is proposed that the scrubbing medium laden with metal carbonyls in a scrubbing step be passed in its entirety to a regeneration or be divided into two substreams of which one substream is introduced as scrubbing medium into the preceding scrubbing step and the other substream is passed to a regeneration.

A process for purifying crude synthesis gases which has been known for many years and is widespread because of its efficiency and good economics is a methanol scrub in which methanol cooled to a low temperature is used as physical scrubbing medium. A preferred embodiment of the process of the invention therefore provides for methanol which has been cooled to a low temperature to be used as physically acting scrubbing medium.

The invention further provides an apparatus for purifying crude synthesis gas containing metal carbonyls, where undesirable substances such as sulphur components and/or carbon dioxide ($CO_2$) and/or hydrocyanic acid (HCN) are scrubbed out by scrubbing with a physically acting scrubbing medium in at least one process step (main scrub).

According to the invention, the object addressed is achieved in terms of an apparatus by the apparatus having a scrubbing facility for largely selectively separating metal carbonyls (carbonyl scrub) from the crude synthesis gas, into which a partial amount of the laden scrubbing medium taken off from the main scrub can be introduced as scrubbing medium.

An embodiment of the apparatus of the invention provides for the carbonyl scrub to have at least two scrubbing sections for carrying out a scrubbing step, with a different class of metal carbonyls being able to be separated off largely selectively from the crude synthesis gas in each of the scrubbing sections by introduction of a suitable amount of scrubbing medium.

Another embodiment of the apparatus of the invention provides for scrubbing medium laden with metal carbonyls in a scrubbing section to be able to be fed in its entirety to a regeneration or be able to be divided into two substreams of which one substream can be introduced as scrubbing medium into the preceding scrubbing step and the other substream can be passed to a regeneration.

Furthermore, the invention provides for the scrubbing section or scrubbing sections for carrying out the carbonyl scrub to be arranged either alone or together with at least one scrubbing section of the main scrub in a scrubbing column. The first of the two variants of the apparatus of the invention offers the possibility of modification of an existing synthesis gas scrub. For this purpose, a column (carbonyl scrubbing column) in which the scrubbing section or scrubbing sections for carrying out the carbonyl scrub are accommodated is arranged upstream of the main scrub. A pump transports the scrubbing medium from the main scrub to the top of the carbonyl scrubbing column.

A preferred embodiment of the apparatus of the invention provides for methanol which has been cooled to a low temperature to be able to be used as physically acting scrubbing medium.

The invention is illustrated below with the aid of an example shown schematically in the FIGURE.

The example is a methanol scrub for purifying a crude synthesis gas containing metal carbonyls, carbon dioxide ($CO_2$) and sulphur compounds. The methanol scrub is located in a scrubbing column W whose lower section C is configured as a carbonyl scrub.

The crude synthesis gas to be purified is introduced via line 1 into the lower part of the methanol scrubbing column W and conveyed upward through the lower scrubbing section C which is configured as a carbonyl scrub. Above the chimney tray K, the prepurified crude synthesis gas 6 goes into the main scrub H where it is freed of $CO_2$ and sulphur compounds by means of methanol which has been cooled to a low temperature and is conveyed in countercurrent as scrubbing medium. The major part of the scrubbing medium laden with the components scrubbed out of the crude synthesis gas in the main scrub, which is taken off from the chimney tray K via line 2, is passed via line 3 to regeneration, while a very much smaller partial amount is conveyed via line 4 to the upper end of the carbonyl scrub C. The partial amount branched off via line 4 is calculated so that it scrubs out the metal carbonyls largely selectively from the crude synthesis gas on its way through the carbonyl scrub C. The scrubbing medium used in the carbonyl scrub C collects in laden form in the bottom S of the scrubbing column W and is passed via line 5 to a regeneration step (not shown) in which the metal carbonyls are separated off from the scrubbing medium in a process which is complicated compared to the process for regenerating the laden scrubbing medium taken off from the main scrub H via line 3.

The invention claimed is:

1. A process for purifying crude synthesis gas containing metal carbonyls and undesirable substances selected from sulphur components, carbon dioxide ($CO_2$), and/or hydrocyanic acid (HCN), said process comprising:
    scrubbing said crude synthesis gas in a main scrub with a physically acting scrubbing medium for scrubbing out said undesirable substances,
    wherein, before being introduced into said main scrub, said crude synthesis gas is subjected to a carbonyl scrub with a partial amount of laden scrubbing medium removed from said main scrub, wherein said partial amount of laden scrubbing medium is chosen so that said metal carbonyls are selectively separated off from said crude synthesis gas in said carbonyl scrub substantially independently of other gas components, and
    wherein separation of said metal carbonyls from said crude synthesis gas in said carbonyl scrub is carried out in at least two successive scrubbing steps, wherein the amount of scrubbing medium used in each of said two successive scrubbing steps is selected so that different metal carbonyls are separated off substantially selectively in each of said two successive scrubbing steps.

2. The process according to claim 1, wherein scrubbing medium laden with metal carbonyls is removed from said carbonyl scrub and is passed in its entirety to a regeneration stage.

3. The process according to claim 1, wherein said physically acting scrubbing medium is methanol which has been cooled.

4. The process according to claim 1, wherein scrubbing medium laden with metal carbonyls is removed from said carbonyl scrub and is divided into two substreams, wherein one substream is introduced as scrubbing medium into a preceding scrubbing step and the other substream is passed to a regeneration stage.

5. The process according to claim 4, wherein said physically acting scrubbing medium is methanol which has been cooled.

6. The process according to claim 1, wherein said undesirable substances comprise carbon dioxide ($CO_2$), hydrogen sulphide ($H_2S$), carbonyl sulphide (COS) and/or hydrocyanic acid (HCN).

7. The process according to claim 1, wherein said main scrub is performed in a main scrub column and said carbonyl scrub is performed in a separate carbonyl scrubbing column.

8. The process according to claim 1, wherein said main scrub is performed in a main scrub column and said at least two successive scrubbing steps of said carbonyl scrub are performed in a separate carbonyl scrubbing column.

9. The process according to claim 1, wherein said main scrub and said carbonyl scrub are both performed in the same scrub column, wherein said carbonyl scrub is performed in a scrubbing section located below and upstream of a scrubbing section where said main scrub is performed.

* * * * *

UNITED STATES PATENT AND TRADEMARK OFFICE
CERTIFICATE OF CORRECTION

PATENT NO.       : 8,357,230 B2  
APPLICATION NO.  : 12/515974  
DATED            : January 22, 2013  
INVENTOR(S)      : Ulvi Kerestecioglu Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 790 days.

Signed and Sealed this

First Day of September, 2015

Michelle K. Lee
*Director of the United States Patent and Trademark Office*